US011330395B2

United States Patent
Bosworth et al.

(10) Patent No.: US 11,330,395 B2
(45) Date of Patent: May 10, 2022

(54) ACCESS CONTROL SYSTEM AND METHOD (71) Applicant: Aurora Flight Sciences Corporation, a subsidiary of The Boeing Company, Manassas, VA (US)

(72) Inventors: William Robert Bosworth, Summerville, MA (US); James Mcdaniel Snider, II, Columbus, MS (US)

(73) Assignee: Aurora Flight Services Corp., a subsidiary of The Boeing Company, Manassas, VA (US)

( * ) Notice: Subject to any disclaimer, the term of this patent is extended or adjusted under 35 U.S.C. 154(b) by 63 days.

(21) Appl. No.: 16/791,340

(22) Filed: Feb. 14, 2020

(65) Prior Publication Data
US 2021/0258719 A1    Aug. 19, 2021

(51) Int. Cl.
*H04W 4/021* (2018.01)
*H04W 4/44* (2018.01)
*G07C 9/10* (2020.01)

(52) U.S. Cl.
CPC .............. *H04W 4/021* (2013.01); *G07C 9/10* (2020.01); *H04W 4/44* (2018.02)

(58) Field of Classification Search
None
See application file for complete search history.

(56) References Cited

U.S. PATENT DOCUMENTS

| | | | |
|---|---|---|---|
| 5,532,690 A | 7/1996 | Hertel | |
| 6,142,372 A * | 11/2000 | Wright | G08G 1/017 235/375 |
| 6,417,760 B1 * | 7/2002 | Mabuchi | G07C 1/10 235/382 |
| 7,117,089 B2 | 10/2006 | Khatwa et al. | |
| 8,532,844 B2 | 9/2013 | Wilson et al. | |
| 8,594,916 B2 | 11/2013 | He | |
| 9,317,036 B2 | 4/2016 | Wang et al. | |
| 9,552,736 B2 | 1/2017 | Taveira | |
| 9,601,022 B2 | 3/2017 | Taveira | |
| 10,140,793 B2 * | 11/2018 | Nordbruch | G07C 9/29 |
| 10,591,576 B1 * | 3/2020 | Tang | G01S 5/0036 |
| 10,732,025 B2 * | 8/2020 | Jones | G01G 19/02 |
| 11,181,375 B2 * | 11/2021 | Michini | G05D 1/0094 |
| 2004/0017929 A1 * | 1/2004 | Bramblet | G07C 9/15 382/103 |

(Continued)

Primary Examiner — Carlos Garcia
(74) Attorney, Agent, or Firm — Armstrong Teasdale LLP (57) ABSTRACT

A method of operating a facility includes identifying, by a controller, a ground vehicle approaching a restricted access area, and determining, by the controller, if the identified ground vehicle is authorized to enter the restricted access area. The controller permits the identified ground vehicle to enter the restricted access area when the controller determines that the identified ground vehicle is authorized to enter the restricted access area. The controller determines if an object other than the identified ground vehicle is approaching the restricted access area with the identified ground vehicle, and activates protective action when the controller determines that the identified ground vehicle is not authorized to enter the restricted access area or that an object other than the permitted ground vehicle is approaching to enter the restricted access area with the permitted ground vehicle.

20 Claims, 5 Drawing Sheets

(56) References Cited

U.S. PATENT DOCUMENTS

| | | | | |
|---|---|---|---|---|
| 2009/0040307 A1* | 2/2009 | Rubin | ............... | G08B 13/19623 |
| | | | | 348/153 |
| 2015/0293535 A1* | 10/2015 | Avery | ................... | G05D 1/0291 |
| | | | | 701/26 |
| 2017/0318417 A1* | 11/2017 | Kusumoto | ............ | H04W 4/029 |
| 2019/0355185 A1* | 11/2019 | Plafchan | ............ | G06K 7/10297 |
| 2021/0285788 A1* | 9/2021 | Sharma | ................. | H04W 4/024 |
| 2021/0327285 A1* | 10/2021 | Wang | ................... | G08G 5/0026 |

\* cited by examiner

ACCESS CONTROL SYSTEM AND METHOD

FIELD

The field of the disclosure relates generally to access control systems and, more specifically, to access control systems including dual access controls.

BACKGROUND

Various facilities, such as factories, warehouses, office buildings, and the like, often have one or more areas to which access is restricted to authorized entrants (e.g., authorized personnel, vehicles, robots, or the like). Such facilities often have an access control system configured to determine if an entrant is authorized, and to allow the entrant to enter the authorized area (e.g., by opening a door, not sounding an alarm, or the like) if the entrant is an authorized entrant.

At least some known access control systems may be defeated by a second party accompanying an authorized entrant. That is, such systems may detect the authorized entrant and unlock a door (or otherwise allow access) to the restricted area, and an unauthorized party may enter the restricted area with or after the authorized entrant before the access control is reset (e.g., before the door to the restricted area is closed).

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

One aspect of the present disclosure is a method of operating a facility in which a plurality of ground vehicles operates. The method includes identifying, by a controller, a ground vehicle approaching a restricted access area, and determining, by the controller, if the identified ground vehicle is authorized to enter the restricted access area. The controller permits the identified ground vehicle to enter the restricted access area when the controller determines that the identified ground vehicle is authorized to enter the restricted access area. The controller determines if an object other than the identified ground vehicle is approaching the restricted access area with the identified ground vehicle, and activates protective action when the controller determines that the identified ground vehicle is not authorized to enter the restricted access area or that an object other than the permitted ground vehicle is approaching to enter the restricted access area with the permitted ground vehicle.

Another aspect of the present disclosure is a system for a facility in which a plurality of ground vehicles operate. The system includes a first sensor and a controller. The controller includes a processor and a memory including instructions. When executed by the processor, the instructions configure the controller to identify, based on a signal from the first sensor, an ground vehicle approaching a restricted access area, determine if the identified ground vehicle is authorized to enter the restricted access area, permit the identified ground vehicle to enter the restricted access area when the controller determines that the identified ground vehicle is authorized to enter the restricted access area, determine if an object other than the identified ground vehicle is approaching the restricted access area with the identified ground vehicle, and activate protective action when the controller determines that the identified ground vehicle is not authorized to enter the restricted access area or that an object other than the identified ground vehicle is attempting to enter the restricted access area with the identified ground vehicle.

Another aspect of the present disclosure is a non-transitory computer readable medium storing instructions. When executed by a processor, the instructions cause the processor to identify an ground vehicle approaching a restricted access area, determine if the identified ground vehicle is authorized to enter the restricted access area, permit the identified ground vehicle to enter the restricted access area when the processor determines that the identified ground vehicle is authorized to enter the restricted access area, determine if an object other than the identified ground vehicle is approaching the restricted access area with the identified ground vehicle, and take protective action when the processor determines that the identified ground vehicle is not authorized to enter the restricted access area or that an object other than the identified ground vehicle is attempting to enter the restricted access area with the identified ground vehicle.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

Although specific features of various examples may be shown in some drawings and not in others, this is for convenience only. Any feature of any drawing may be referenced and/or claimed in combination with any feature of any other drawing.

Unless otherwise indicated, the drawings provided herein are meant to illustrate features of examples of the disclosure. These features are believed to be applicable in a wide variety of systems comprising one or more examples of the disclosure. As such, the drawings are not meant to include all conventional features known by those of ordinary skill in the art to be required for the practice of the examples disclosed herein.

DETAILED DESCRIPTION

This disclosure relates generally to access control systems and, more specifically, to access control systems including dual access controls. Generally, the system includes a first access control to identify a prospective entrant to a restricted access area and determine whether or not to allow the prospective entrance into the restricted access area, and a second access control that determines whether or not an additional prospective entrant is also approaching the restricted access area. If the prospective entrant is not to be allowed into the restricted access area or an additional prospective entrant is approaching the restricted access area, the system takes protective action. Thus, unauthorized entry of the prospective entrant or the additional prospective entrant (tailgating or piggybacking on the prospective entrant) may be avoided or other protective action may be taken.

Figure 1:
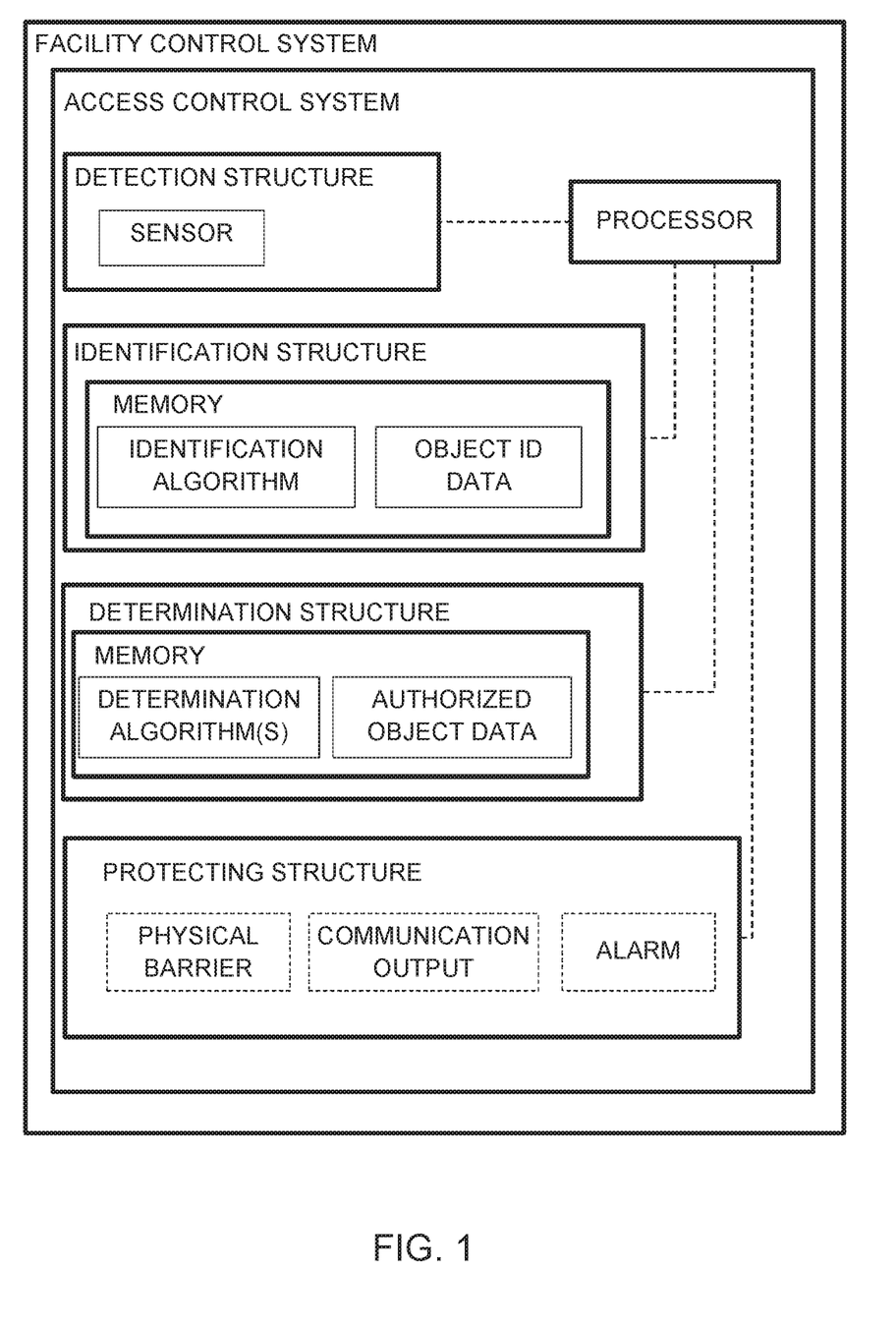
FIG. 1 is a functional block diagram of an example facility control system.

Referring to the drawings, FIG. 1 is a functional block diagram of a facility control system. The facility control system includes, among other components for controlling the facility (not shown), an access control system. The access control system includes a detection structure, an identification structure, a determination structure, a protecting structure, and a processor. The processor is may be communicatively coupled to one or more of the detection, identification determination structure, or a protecting structures, as indicated by the dashed connections between the processor and those structures.

The detection structure detects an object, such as a vehicle or a person, approaching (or in the vicinity of) an area to which access is controlled by the access control system (sometimes referred to herein as a restricted access area). The detection structure includes at least one sensor operable to detect an object approaching the limited access area. The sensor(s) may include cameras, passive infrared detectors, weight sensors, metal detectors, an RFID sensor, or any other suitable sensors.

The identification structure identifies any objects detected by the detection structure. The identification structure includes a memory storing an identification algorithm that includes instructions for causing the processor to identify the detected object(s), and object identification (ID) data for identifying the detected object(s). For example, the data may be data about the weight of various objects, and the identification algorithm may cause the processor to compare a weight detected by a weight sensor to the object ID data to identify the detected object. In another example, the identification algorithm may be a computer vision object detection algorithm for execution by the processor and the object ID data may be templates or other data for use with the algorithm. In still other examples, the object ID data may be RFID identifiers for various objects, and the identification algorithm causes the processor to compare an RFID identifier detected by the detection structure's sensor to the RFID identifiers in the object ID data to identify the detected object.

The determination structure determines if the identified object is authorized to enter the restricted access area, and determines if an object other than the identified and authorized object is approaching the restricted access area with, near or on the authorized object. The determination algorithms cause the processor to compare the identified object to the authorized object data to determine if the identified object is authorized to enter the restricted access area. Similarly, the determination algorithms cause the processor to compare any additional identified objects to the authorized object data to determine if the additional identified object is authorized to enter the restricted access area. In some embodiments, the same determination algorithm performs both comparisons, while other embodiments utilize separate algorithms.

The protecting structure can be activated by the processor based on the results of the determinations using the determination structure. The protecting structure can include one or more of a physical barrier (such as a door, a gate, a lock, etc.), a communication output for outputting an alert to a remote device, or an alarm (such as a siren or a flashing light). If either the object approaching the restricted access area or another object approaching with the object is not authorized to enter the restricted access area, the processor may shut/lock/not open the physical barrier, output an alert via the communication output, and/or sound the alarm.

Figure 2:
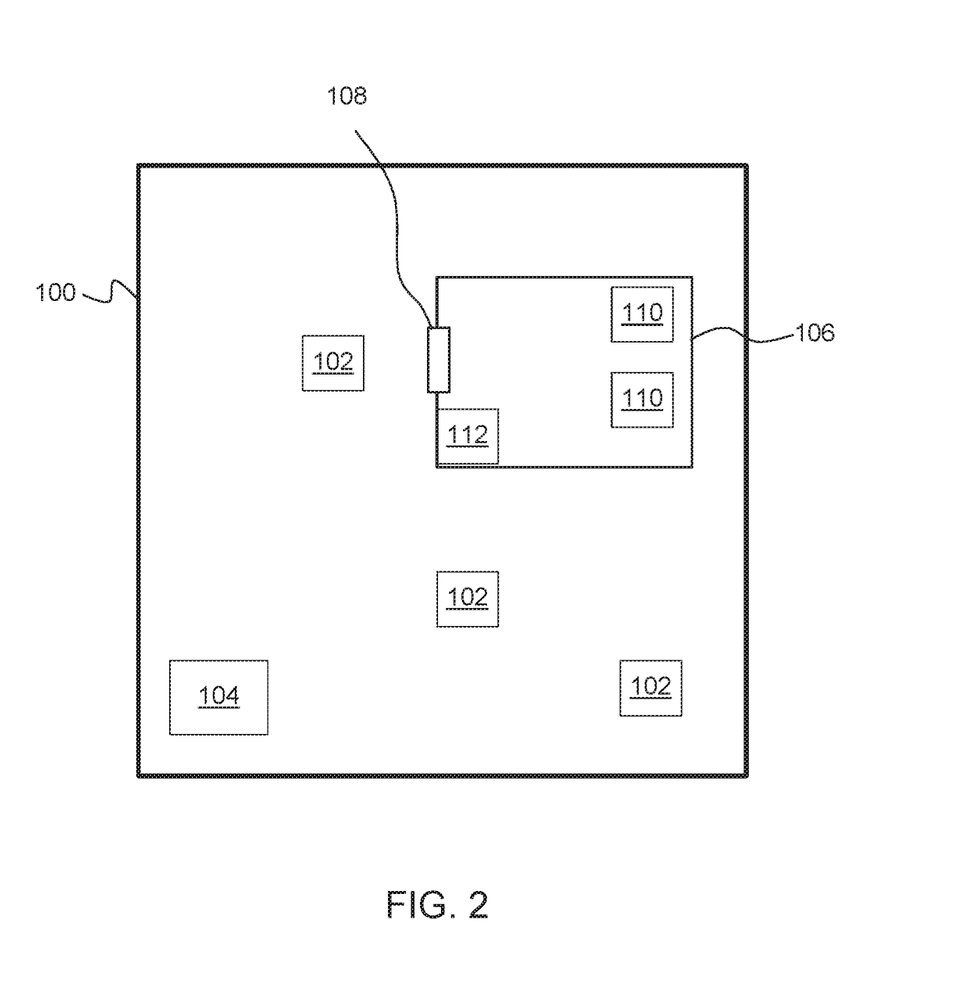
FIG. 2 is a block diagram of an example facility in which a plurality of vehicles operate.

FIG. 2 is a block diagram of an example facility 100 in which a plurality of vehicles 102 operate, and incorporating one or more aspects of the control system of FIG. 1. The facility 100 may include, for example, a building or more than one building. In the example implementation, the facility 100 is a machining an inspection facility. In other implementations, the facility is an assembly facility, a manufacturing facility, a warehouse facility, or any other suitable facility including one or more restricted access areas (discussed below).

In the example implementation, the vehicles 102 are ground vehicles. In other implementations, the vehicles 102 are air vehicles, such as a drone. The vehicles 102 perform functions such as carrying and delivering components for assembly, carrying and delivering assembled products, inventory control, driving humans around the facility 100, carrying and delivering replacement/repair parts, or the like.

In some implementations, the vehicles are autonomous vehicles (AV). The vehicles 102 that are AVs are robotic vehicles programmed to navigate the facility 100 and to perform one or more tasks autonomously (i.e., without needing human control or intervention). For example, each vehicle 102 is separately programmed to navigate and perform its tasks autonomously. Alternatively, each AV vehicle 102 may be controlled by a central or facility control system 104. Even when the vehicles 102 are each separately programmed, the facility control system 104 may override the programming of the individual vehicles 102 or may provide supplemental instructions and controls to the vehicles 102. In other implementations, the vehicles 102 are not autonomous vehicles. For example, the vehicles 102 may be semi-autonomous vehicles (requiring some control/input from a human operator), or may be completely human operator controlled vehicles, whether operated by a human present in/on the vehicle 102 or remotely operated by a human located elsewhere.

The facility 100 includes a restricted access area 106. The restricted access area 106 is a portion of the facility 100 to which access is restricted to particular entrants (e.g., to particular ones of the vehicles 102 or to particular humans or to vehicle 102 that are carrying unauthorized objects). The restricted access area may be enclosed by walls with an entrance 108, such as a door or optical safety curtain, through which authorized entrants are allowed to enter the restricted access area 106. Alternatively, the restricted access area 106 may not be enclosed by walls (or may be only partially enclosed by walls) and may be demarcated by a safety curtain or boundary demarcation designating a restricted access area 106. In general, the restricted access area 106 is defined by some boundary with an entrance 108 through which authorized vehicles 102 are permitted to pass and enter the restricted access area 106. Although only one restricted access area 106 is shown in FIG. 2, the facility 100 may include more than one restricted access area, each of which is operated similar to as described herein for the shown restricted access area 106.

Access to the restricted access area 106 may be restricted for any reason. In the example implementation, the restricted access area 106 houses machines 110 for performing various tasks. Access is restricted because the area around the machines may be dangerous to humans when the machines 110 are operating. Thus, in the example, the restricted access area 106 is restricted to access by vehicles 102 to prevent humans from approaching the machines 110 while the machines are operating. Any unauthorized object detected approaching the restricted access area 106 with an authorized vehicle 102 will cause protective action to be taken to facilitate reducing the risk of injury to the humans while the machines are operating. Moreover, the access may be restricted to only certain ones of the vehicles 102 that have need to access the machines 110. Alternatively or additionally, the restricted access area 106 may house confidential or sensitive material, supplies, other items creating potential hazardous conditions or requiring particular safety precautions, or any other items to which access is desired to be restricted and/or monitored.

Figure 3:
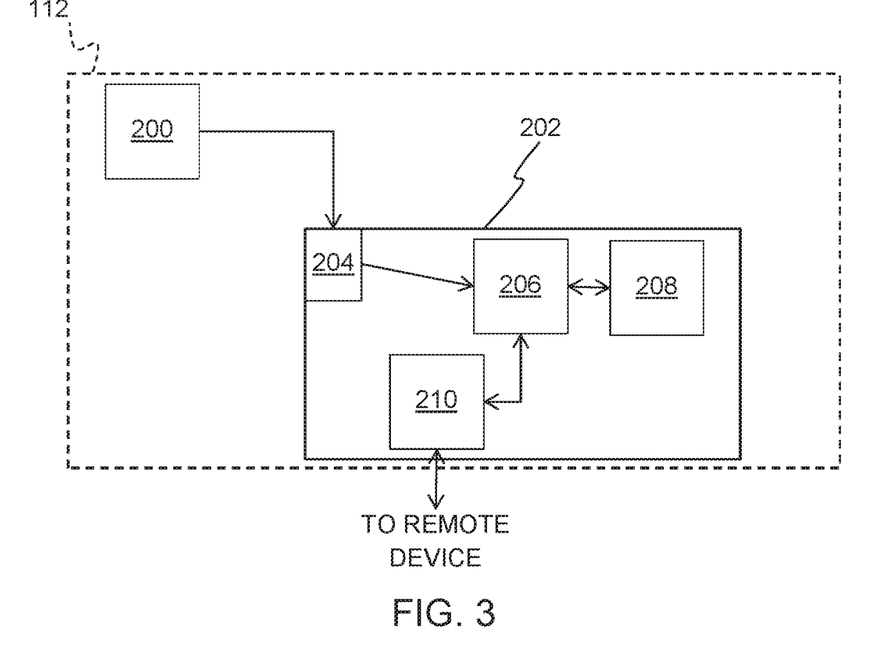
FIG. 3 is a block diagram of an example access control system of the facility of FIG. 2.

An access control system 112 controls access to the restricted access area 106. As shown in FIG. 2, which is a block diagram of an example access control system 112 for the facility 100 of FIG. 2, the access control system 112 includes a sensor 200 and a controller 202.

The controller 202 may include any suitable combination of analog and/or digital controllers capable of performing as described herein. In the example, the controller 202 includes an input 204 for receiving signals from the sensor 200, a processor 206, a memory 208, and a communication interface 210. The processor 206 is coupled to memory 208 for executing programmed instructions. The processor 206 may include one or more processing units (e.g., in a multi-core configuration). The controller 202 is programmable to perform one or more operations described herein by programming the memory 208 and/or the processor 206. For example, the processor 206 may be programmed by encoding an operation as one or more executable instructions and providing the executable instructions in the memory 208.

The processor 206 may include, but is not limited to, a general purpose central processing unit (CPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer-readable medium including, without limitation, a storage device and/or a memory device. Such instructions, when executed by the processor 206, cause the processor 206 to perform at least a portion of the methods described herein. The above examples are not intended to limit in any way the definition and/or meaning of the term processor.

The memory 208, as described herein, is one or more devices that enable information such as executable instructions and/or other data to be stored and retrieved. The memory 208 may include one or more computer-readable media, such as, without limitation, dynamic random access memory (DRAM), static random access memory (SRAM), a solid state disk, a hard disk, and/or any other suitable type of memory. The memory 208 may be configured to store any instructions or any type of data suitable for use with the methods and systems described herein.

The communication interface 210 communicatively couples the controller 202 to a remote device, such as facility control system 104, vehicles 102, or any other device separate from the controller 202. Alternatively, the controller 202 may not include a communication interface 210, or may be communicatively coupled to a different remote device through the communication interface. The communication interface 210 is, for example, a network adapter that connects the controller 202 to a network (not shown), such as the Internet, an intranet, a local area network (LAN), a wide area network (WAN), a mobile network, a virtual network, and/or another suitable network for communicating data between controller 202 and other remote device(s). The communication interface 210 may be a wired or a wireless communication interface.

In the example, the controller 202 is separate from the facility control system 104. In other implementations, the access control system 112 or the controller 202 is part of the facility control system 104 and/or the one or more functions described as performed by the access control system 112 herein are performed by the facility control system 104. The sensor 200 is used by the controller 202 to identify vehicles 102 approaching the restricted access area 106. The sensor 200 is positioned internal or external to the restricted access area 106 at a location from which the sensor 200 can detect vehicles 102 approaching the entrance 108 so that they may be identified by the controller 202 (discussed in detail below). The sensor 200 is also used by the controller 202 to detect objects approaching the entrance 108 to the restricted access area 106 other than authorized vehicles 102. The sensor 200 may be any type of sensor suitable for detection of vehicles 102 and objects other than vehicles 102.

In an example, the sensor 200 is an optical sensor, such as a camera. The camera captures images (or frames of a video) of a region near the entrance 108 and provides the images to the controller 202. The controller 202 processes the captured images to identify any vehicles 102 in the images. A vehicle 102 captured in the images may be identified by, for example, identification of a unique identifier, such as a bar code, a QR code, a particular color or combination of colors, a shape of the vehicle 102, or any other suitable visible identifier, of the vehicle 102. In some implementations, the unique identifier uniquely identifies a class of vehicles 102, such as forklifts, inventory robots, or the like, when an entire class of vehicles 102 is authorized to enter the restricted access area 106 or when only one of each type of vehicle 102 is present at the facility 100. The identified unique identifier may be compared to a list of such identifiers, for example stored in memory 208, to determine the specific vehicle in the captured image. The identified vehicle is compared by the controller 202 to a list of vehicles 102 authorized for entry into the restricted access area 106 to determine if the identified vehicle may enter the restricted access area 106. Alternatively, the list that identifies the vehicle by the unique identifier may also list the areas, including the restricted access area 106, to which that particular vehicle 102 is authorized to enter.

In other implementations, the vehicle 102 may be identified in a captured image based on the appearance of the vehicle 102, such as by performing computer vision based object detection on the captured image(s). However identified, if the vehicle 102 is authorized to enter the restricted access area 106, the controller allows the identified and authorized vehicle 102 to enter the restricted access area 106, such as by opening a door (when the entrance 108 includes a door), not sounding an alarm, and/or not taking other protective or notifying action to deter entrance to the restricted access area 106.

In some implementations, the controller also looks for and identifies anything being carried by or riding on the vehicle 102. This identification may be made using a captured image of the vehicle 102, such as by performing computer vision based object detection on the captured image(s). If objects carried by or riding on the vehicle 102 (sometimes collectively referred to as cargo herein), the controller determines if the cargo is authorized to enter the restricted area. If the cargo is authorized to enter the restricted access area 106, the controller allows the identified and otherwise authorized vehicle 102 to enter the restricted access area 106, such as by opening a door (when the entrance 108 includes a door), not sounding an alarm, and/or not taking other protective or notifying action to deter entrance to the restricted access area 106. If the cargo is not authorized to enter the restricted area 106, the controller does not allow the identified and otherwise authorized vehicle 102 to enter the restricted area 106.

Further, the controller 202 may use the captured images to identify any objects other than the identified vehicle 102 in the images by performing object detection and recognition on the captured images. In an example, the controller 202 performs object detection on the captured images to detect any objects approaching the restricted access area (and specifically approaching the entrance 108) that are not the authorized vehicle 102. The controller 202 also performs recognition to identify what type of object has been detected (e.g., identifying that the object is a delivery vehicle rather than a dump truck). The controller 202 further identifies (or attempts to identify the specific one of the type of object that has been detected (e.g., identify that the authorized vehicle is delivery vehicle number 1 rather than delivery vehicle number 2). In some implementations, the controller 202 may take protective action when any object other than the authorized vehicle 102 is also approaching the restricted access area 106. In other implementations, the controller 202 performs image recognition on any other object located near the authorized vehicle 102 and only takes protective action if the other object is not a vehicle 102. By identifying non-vehicles approaching the restricted access area 106 along with the identified vehicle 102, the controller may take appropriate protective action, such as to prevent the non-vehicle from entering the restricted access area 106 with the identified and authorized vehicle.

In another implementation, the sensor 200 is a weight sensor positioned in front of the entrance 108. Such an implementation may be useful when the vehicles 102 operating in the facility have weights known to the controller (such as by being stored in the memory 208), and the known or anticipated weight of each vehicle 102 is different from the weight of the other vehicles 102. The controller 202 may use the weight detected by the sensor 200 to identify which vehicle is approaching the entrance 108. Further, if the detected weight is different from the weight of any of the vehicles 102, the controller 202 may determine that an object other than one of the vehicles 102 (or in addition to one of the vehicles) is approaching the entrance 108 of the restricted access area 106. Additionally, if the detected weight corresponds to one of the vehicles 102, but the detected weight changes before the vehicle 102 enters the restricted access area 106, the controller may determine that another object is also approaching the restricted access area 106 and may take appropriate protective action.

Figure 4:
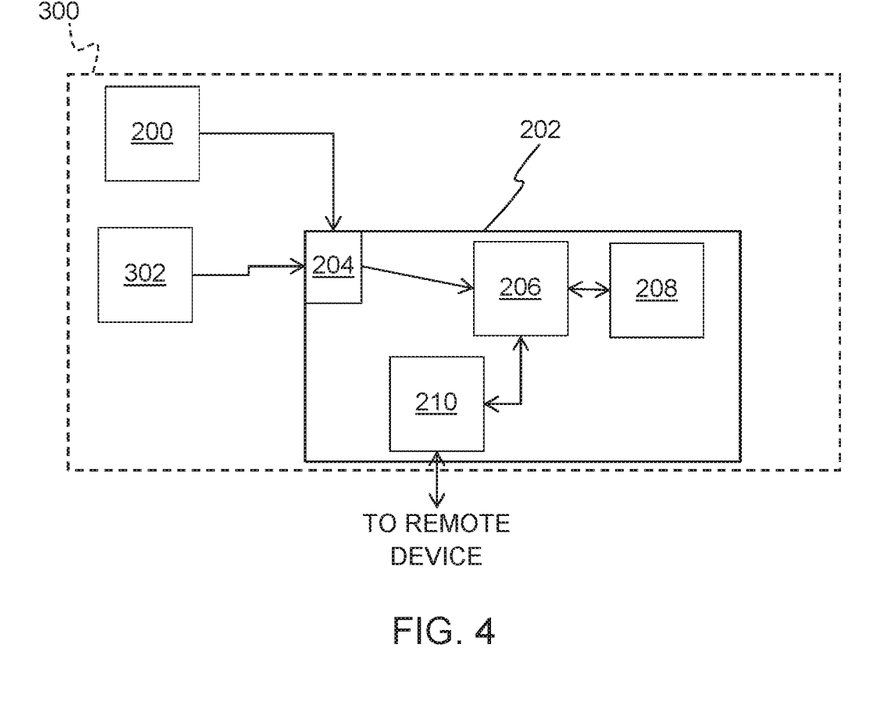
FIG. 4 is a block diagram of another example access control system that may be used as the access control system of the facility of FIG. 2.

In other implementations, two different sensors may be used by the controller 202 to identify vehicles 102 approaching the restricted access area 106 and to detect objects approaching the entrance 108 to the restricted access area 106 other than authorized vehicles 102. FIG. 4 is a block diagram of another example access control system 300 that may be used as the access control system 112. The access control system 300 is similar to the access control system 112, and similar reference numerals are used for similar components. The access control system 300 utilizes two sensors, sensor 200 (which may be referred to as a first sensor 200) and sensor 302 (which may be referred to as a second sensor 302). Moreover, the sensor 200 may be referred to as a first sensor 200 in the context of a single sensor implementation, such as in the access control system 112 of FIG. 2, without any implication that a second sensor is used.

In the implementation of FIG. 4, the first sensor 200 is used by the controller 202 to identify vehicles 102 approaching the restricted access area 106, and the second sensor 302 is used by the controller 202 to detect objects approaching the entrance 108 to the restricted access area 106 other than detected vehicles 102. In this implementation, the first sensor may be an optical sensor, a radio frequency identification sensor, a laser scanner, or any other sensor suitable for detecting a machine-readable code, such as a barcode and a QR code, an RFID tag, or other unique identifier of the vehicles 102. In the example, the second sensor 302 is a different type of sensor from the first sensor 200, and it is used to detect other objects approaching the restricted access area 106. For example, the first sensor 200 may be an RFID sensor to detect an RFID tag on the vehicle 102 approaching the restricted access area 106. Based on the unique identifier provided to the RFID sensor by the RFID tag, the vehicle 102 may be identified and its authorization to enter the restricted access area 106 may be determined. In such an example, the second sensor 302 may be an optical sensor that detects objects other than the vehicle 102 as described above. Alternatively, the second sensor 302 may be a weight sensor that detects the weight of objects in an area around the entrance 108. By comparing the detected weight to the expected weight of the identified vehicle 102 (including the weight of any expected cargo), the controller can determine if there are any objects other than the identified vehicle 102 in the area covered by the weight sensor.

Figure 5:
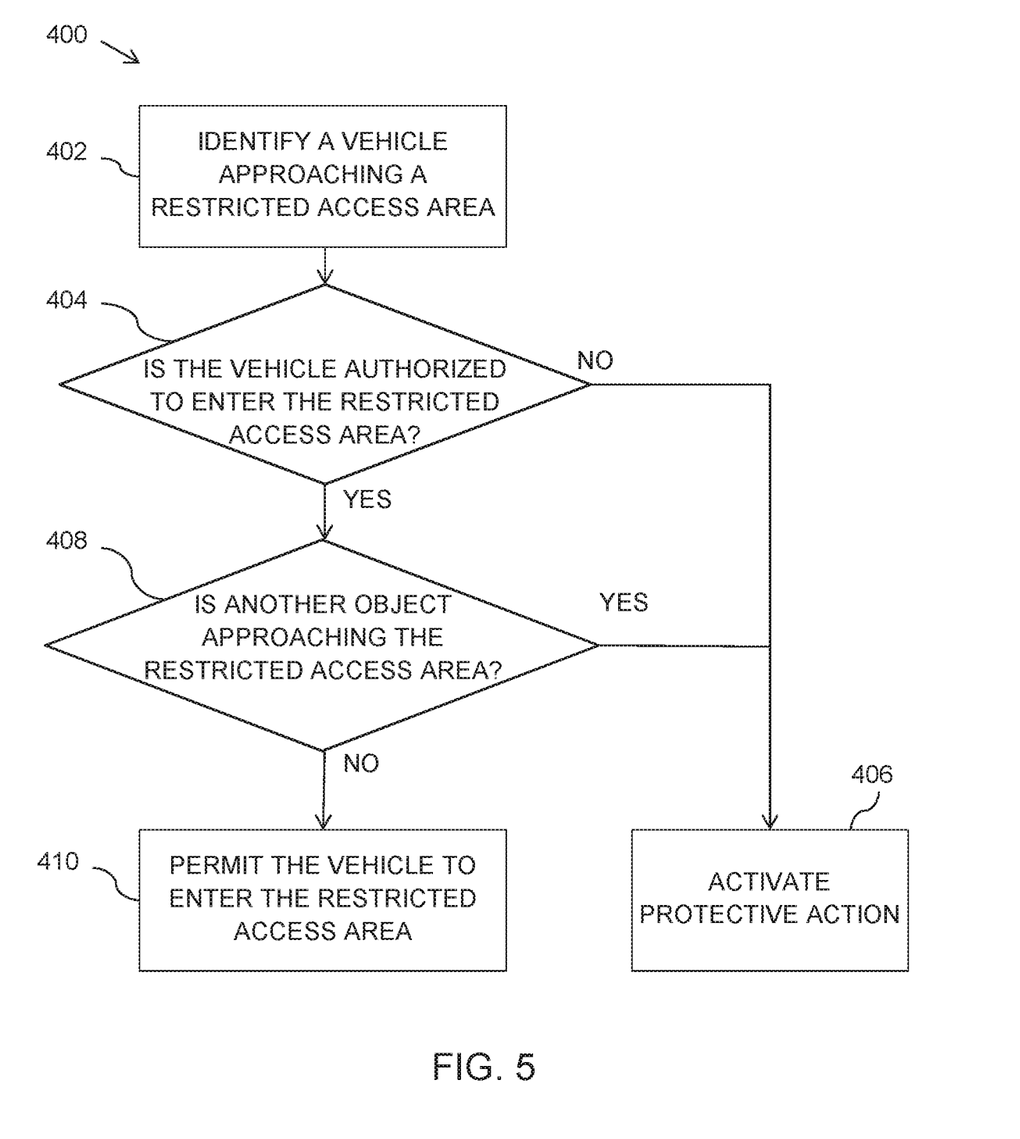
FIG. 5 is a flow diagram of a method of operating a facility in which a plurality of vehicles operate.

FIG. 5 is a flow diagram of a method 400 of operating a facility in which a plurality of vehicles operate. The method will be described with reference to the facility 100 (shown in FIG. 2) using the access control systems 112 and 300 (shown in FIGS. 2 and 3 respectively). Further, the method 400 will be described with respect to vehicles 102 that are AVs. It should be understood, however, that the method 400 may be used in other facilities, with vehicles other than AVs, and may be performed by other access control systems.

Figure 6:
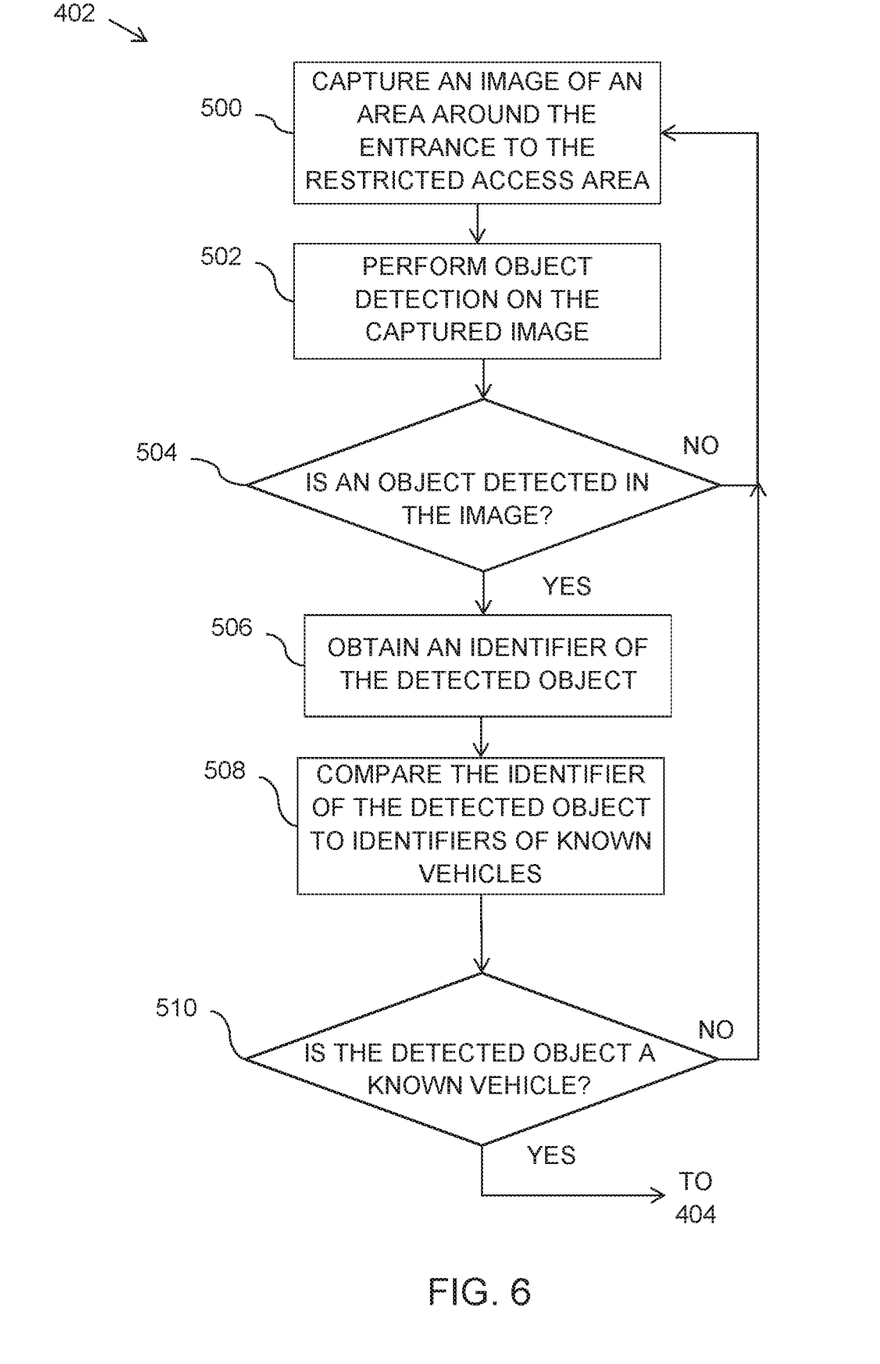
FIG. 6 is a flow diagram of an example method of identifying a ground vehicle approaching the restricted access area in the method of FIG. 5 when the first sensor is a camera.

At 402, the controller 202 identifies a vehicle 102 approaching the restricted access area 106. The controller 202 identifies the vehicle 102 approaching the restricted access area 106 using the first sensor 200. FIG. 6 is a flow diagram of an example method of identifying 402 the vehicle 102 approaching the restricted access area 106 when the first sensor 200 is a camera. The step 402 includes capturing 500 an image of an area around the entrance 108 to the restricted access area 106. At 502, the controller 202 performs object detection on the captured image. If no object is detected at 504, the process returns to 500. If an object is detected at 504, the controller 202 obtains 506 an identifier of the detected object. The identifier may be a bar code on the detected object, a QR code on the detected object, a shape of the detected object, a color or pattern of colors on the detected object, or any other suitable identifier. The controller 202 compares 508 the obtained identifier to known vehicles. For example, the controller 202 may retrieve a list or access a database stored in the memory 208 and compare the obtained identifier to known identifiers of known vehicles 102 in the list or database. At 510, if the identifier does not match any of the known vehicles 102, the process returns to 500. Alternatively or additionally, the controller 202 may take protective action (e.g. sounding an alarm, sending an alert to a remote device, or the like) if the identifier does not match a known vehicle 102. Similarly, the controller 202 may take a protective action if an identifier is not able to be obtained for the detected object. If the identifier identifies the object as a known vehicle 102, the AV is identified and the process proceeds to 404 in FIG. 5.

In other implementations, the identification at 402 occurs by the controller 202 scanning a unique identifier, such as a bar code or a QR code, using an optical scanner without capturing an image around the entrance 108 or performing object detection (i.e. without 500, 502, and 504 in FIG. 6). Rather, the first sensor 200 in such implementations may be focused on a location at which the unique identifier will appear when the AV 102 approaches the entrance 108 or the vehicle 102 may maneuver to position the unique identifier in the narrower view of the first sensor 200. Alternatively, the identification 402 occurs by the controller 202 using an RFID receiver as the first sensor 200 to retrieve a unique identifier from an RFID tag on the vehicle 102 that is approaching the entrance 108 of the restricted access area 106 (again instead of 500, 502, and 504 in FIG. 6). In still other implementations, the identification at 402 by the controller 202 is based on the weight of the vehicle 102 that is approaching the entrance 108 of the restricted access area 106 using a weight sensor as the first sensor 200. Alternatively, any other suitable process for obtaining an identifier of an vehicle 102 that is approaching the entrance 108 of the restricted access area 106 may be used. Moreover, more than one method of obtaining an identifier (or of obtaining multiple identifiers may be used. For example, the process shown in FIG. 6 may be used to identify the vehicle 102 with a camera based on the shape of the AV, and a weight sensor or barcode scanner may be used to confirm the identification of the vehicle 102 (for example in an implementation with two sensors 200 and 302 as in FIG. 4). Other implementations may use any other suitable combination of methods and sensors may be used.

In other implementations, the controller 202 may communicate with the vehicle 102 that is approaching the restricted access area 106, such as through use of the communication interface 210 as part of identifying the vehicle 102 that is approaching the restricted access area 106. In such implementations, the communication interface 210 may function as the first sensor 200. The vehicle 102 may provide identification, such as an identification number, name, or the like, to the controller 202 over the communication link between the two.

In some implementations, the controller 202 may affect the speed or trajectory of the vehicle 102 that is approaching the restricted access area 106 to facilitate identifying the particular vehicle 102. For example, the controller 202 may broadcast (e.g., using the communication interface 210) an instruction to the vehicle 102 that is approaching the restricted access area 106 to decrease its speed, change its course, or take other specific action. In other implementations, the controller 202 may control the vehicle 102 to change the speed or course of the vehicle 102 that is approaching the restricted access area 106.

Returning to FIG. 5, the controller 202 determines 404 if the identified vehicle 102 is authorized to enter the restricted access area 106. For example, the controller 202 may retrieve a list or access a database stored in the memory 208 that lists the vehicles 102 or known features/thresholds of vehicles that are authorized to enter the restricted access area 106, and determines if the identified vehicle 102 in the list or database of authorized vehicle 102. Alternatively, the list or database accessed to identify the vehicle 102 that is approaching the restricted access area 106 may also indicate if the vehicle 102 is authorized to enter the restricted access area or may indicate which (if there are more than one) restricted access areas the AV is authorized to enter. Further, the authorization may be a conditional authorization that indicates that the vehicle 102 is authorized to enter the restricted access area only under certain conditions, such as at certain times of day, only when carrying certain loads, or the like. If the conditions are not met at the time when the authorization is being checked by the controller 202, the vehicle 102 that is approaching the restricted access area 106 is not authorized to enter the restricted access area 106.

Additional factors, such as the current situational data, may be used by the controller 202 to determine if the vehicle 102 is allowed to enter the restricted access area 106. For example, the controller 202 may prevent the vehicle 102 from entering, such as by not opening a door in the entrance 108 or by instructing the identified vehicle 102 to not enter the restricted access area, when the restricted access area 106 is already occupied by one or more other vehicles 102, when conditions within the restricted access area might be hazardous to the identified vehicle 102, when another vehicle 102 is exiting the restricted access area 106, or when the current situation otherwise disfavors entrance of the vehicle 102 into the restricted access area 106.

If the controller 202 determines that the vehicle 102 that is approaching the restricted access area 106 is not authorized (whether never authorized, not authorized because of current conditions, or the like), the method proceeds to 406 and takes protective actions. The main protective action taken by the controller 202 is not to allow the vehicle 102 to enter the restricted access area 106, such as by not opening a door (or closing a door or gate) in the entrance 108, deploying an alternative barrier, instructing the vehicle 102 not to enter the restricted access area, or the like. The protective actions taken by the controller 202 can include additional protective actions that vary depending on the circumstances of the lack of authorization. For example, if the vehicle 102 is not authorized to enter at the current time, but is authorized to enter at a later time, the controller 202 may also instruct the vehicle 102 (or control the vehicle 102) to stop and wait until the time at which it is authorized to enter. If the AV is never authorized to enter the restricted access area 106, the controller 202 may also sound an alarm, send an alert to a remote device (such as the facility control system 104 or a device operated by a human operator), shut down the vehicle 102, or take other suitable protective actions.

In the example implementation, if the vehicle 102 that is approaching the restricted access area 106 is authorized, the method 400 continues to determine at 408 if there is another object approaching the restricted access area 106. As discussed above, the controller 202 may use the first sensor 200, the second sensor 302, or a combination of both sensors 200 and 302 to detect if another object is approaching the restricted access area 106. In this implementation, if no other object is detected approaching the restricted access area, the authorized vehicle 102 is permitted at 410 to enter the restricted access area 106. Permitting the authorized vehicle 102 to enter the restricted access area may be an active permission, such as by opening a door, gate, or other barrier in the entrance 108, or passive permission by not taking any action (e.g., not sounding an alarm when the restricted access area 106 does not include any physical barrier to admission), or a combination thereof.

If another object is detected approaching the restricted access area 106 with the authorized vehicle 102 at 408, the controller 202 activates protective action at 406. In some implementations, the controller 202 activates the protective action upon detecting any other object approaching the restricted access area 106. Alternatively, taking protective action may be limited to instances of particular other objects approaching the restricted access area 106. For example, the controller 202 may perform image recognition on a captured image to classify the object approaching the restricted access area 106 with the vehicle 102. If the object is not another vehicle 102, the controller 202 will take protective action. In such implementations, the controller need not identify the object with specificity, but only identify that the object is in the class of "not an AV." Such an implementation may be useful when all vehicles 102 are authorized to enter the restricted access area, but no other objects (such as humans) are authorized to enter. In such instances, the protective action may include (in addition to closing or not opening a barrier at the entrance 108, if present) sounding an alarm, sending a notification to a remote device, and/or shutting down the machines 110 operating in the restricted access area 106. In some implementations, the controller 202 attempts to identify the other object and determine if the other object is authorized to enter the restricted access area 106 in a manner similar to that discussed herein for the vehicle 102 that is approaching the restricted access area 106.

The determination at 408 of whether or not another object is approaching the restricted access area 106 need not be conditioned on the identified vehicle 102 being authorized to enter the restricted access area 106 (i.e., 404). Rather, in some implementations, the determinations at 404 and 408 are performed in parallel. If the vehicle 102 that is approaching the restricted access area 106 is determined not to be authorized at 404 or there is another object approaching the restricted access area 106 at 408, the method proceeds to 406 and the controller 202 takes protective action. If the vehicle 102 that is approaching the restricted access area 106 is authorized at 404 and there is not another object approaching the restricted access area 106 at 408, the method proceeds to 410 and the controller 202 permits the authorized vehicle 102 to enter the restricted access area.

The systems and methods described herein are not limited to the specific examples described herein, but rather, components of the systems and/or steps of the methods may be utilized independently and separately from other components and/or steps described herein.

As used herein, an element or step recited in the singular and proceeded with the word "a" or "an" should be understood as not excluding plural elements or steps unless such exclusion is explicitly recited. Furthermore, references to "one example" of the present disclosure, "an example," or "some examples" are not intended to be interpreted as excluding the existence of additional examples that also incorporate the recited features.

This written description uses examples to disclose various examples, which include the best mode, to enable any person skilled in the art to practice those examples, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of operating a facility, the method comprising:
   identifying, by a controller, an autonomous ground vehicle approaching a restricted access area based on a detected visible identifier of the autonomous ground vehicle or a class of the ground vehicle;
   determining, by the controller, if the identified autonomous ground vehicle is authorized to enter the restricted access area by comparing the visible identifier to a database storing identifiers of authorized vehicles or classes of vehicles;
   permitting, by the controller, the identified autonomous ground vehicle to enter the restricted access area when the controller determines that the identified autonomous ground vehicle is authorized to enter the restricted access area;
   determining, by the controller, if an object other than the identified autonomous ground vehicle or any other autonomous ground vehicle is approaching the restricted access area with the identified autonomous ground vehicle; and
   transmitting, by the controller, instructions to the identified autonomous ground vehicle to not enter the restricted access area when the controller determines that the identified autonomous ground vehicle is not authorized to enter the restricted access area or that an object other than the permitted autonomous ground vehicle is approaching to enter the restricted access area with the permitted autonomous ground vehicle.

2. The method of claim 1, wherein permitting the identified autonomous ground vehicle to enter the restricted access area comprises opening a barrier to the restricted access area.

3. The method of claim 1, further comprising taking additional protective action to prevent unauthorized entry into the restricted access area, the additional protective action including at least one of preventing the object from entering the restricted access area, turning off at least one machine operating in the restricted access area, and activating an alarm.

4. The method of claim 1, wherein identifying the autonomous ground vehicle approaching the restricted access area comprises detecting, by a first sensor, the visible identifier including a bar code or a QR code affixed to the autonomous ground vehicle.

5. The method of claim 1, wherein identifying the autonomous ground vehicle approaching the restricted access area comprises identifying the autonomous ground vehicle approaching the restricted access area using a first sensor configured to detect the visible identifier of the autonomous ground vehicle approaching the restricted access area.

6. The method of claim 5, wherein determining if the object other than the identified autonomous ground vehicle is approaching the restricted access area comprises determining if the object that is not the identified autonomous ground vehicle is detected using a second sensor different than the first sensor.

7. The method of claim 6, wherein the second sensor comprises an optical sensor, and determining if an object that is not the identified autonomous ground vehicle is detected using the second sensor comprises capturing at least one image of an area around the identified autonomous ground vehicle and performing image recognition on the at least one image to identify any object in the at least one image that is not the identified autonomous ground vehicle.

8. A system for operating a facility, the system comprising:
- a first sensor; and
- a controller comprising a processor and a memory including instructions that, when executed by the processor, configure the controller to:
  - identify an autonomous ground vehicle approaching a restricted access area, based on a signal from the first sensor detecting a visible identifier of the ground vehicle or a class of the ground vehicle;
  - determine if the identified autonomous ground vehicle is authorized to enter the restricted access area by comparing the visible identifier to a database storing identifiers of authorized vehicles or classes of vehicles;
  - permit the identified ground vehicle to enter the restricted access area when the controller determines that the identified autonomous ground vehicle is authorized to enter the restricted access area;
  - determine if an object other than the identified autonomous ground vehicle or any other autonomous ground vehicle is approaching the restricted access area with the identified autonomous ground vehicle; and
  - transmit instructions to the identified autonomous ground vehicle to not enter the restricted access area when the controller determines that the identified autonomous ground vehicle is not authorized to enter the restricted access area or that an object other than the identified autonomous ground vehicle is attempting to enter the restricted access area with the identified autonomous ground vehicle.

9. The system of claim 8, wherein the instructions further configure the controller to determine entrance of the autonomous ground vehicle into the restricted access area based on current situational data, and to permit the identified autonomous ground vehicle to enter the restricted access area when the controller determines that the identified autonomous ground vehicle is authorized to enter the restricted access area.

10. The system of claim 8, wherein the instructions further configure the controller to transmit instructions to the identified autonomous ground vehicle that cause a decrease of a speed at which the autonomous ground vehicle is approaching the restricted access area.

11. The system of claim 8, wherein the instructions further configure the controller to determine if the object other than the identified autonomous ground vehicle is approaching the restricted access area with the identified autonomous ground vehicle using the first sensor.

12. The system of claim 11, wherein the first sensor comprises a camera.

13. The system of claim 12, wherein the instructions further configure the controller to determine if an object other than the identified autonomous ground vehicle is approaching the restricted access area with the identified autonomous ground vehicle using the camera by performing image recognition on an image of an area including at least a portion of the identified autonomous ground vehicle.

14. The system of claim 13, wherein the instructions further configure the controller to determine that an object other than the identified autonomous ground vehicle is approaching the restricted access area with the autonomous identified ground vehicle when the object that is not an autonomous ground vehicle is detected in the image by the image recognition.

15. The system of claim 8, further comprising a second sensor of a type different than the first sensor, and wherein the instructions configure the controller to determine if an object other than the identified autonomous ground vehicle is attempting to enter the restricted access area by determining if an object that is not the identified autonomous ground vehicle is located near the identified autonomous ground vehicle using the second sensor.

16. The system of claim 15, wherein the second sensor comprises a weight sensor, and the instructions configure the controller to determine if an object other than the identified autonomous ground vehicle is attempting to enter the restricted access area by comparing a weight sensed by the weight sensor to an anticipated weight of the identified autonomous ground vehicle.

17. A non-transitory computer readable medium storing instructions that, when executed by a processor, cause the processor to:
- identify an autonomous ground vehicle approaching a restricted access area based on a detected visible identifier of the autonomous ground vehicle or a class of the ground vehicle;
- determine if the identified autonomous ground vehicle is authorized to enter the restricted access area by comparing the visible identifier to a database storing identifiers of authorized vehicles or classes of vehicles;
- permit the identified autonomous ground vehicle to enter the restricted access area when the processor determines that the identified autonomous ground vehicle is authorized to enter the restricted access area;
- determine if an object other than the identified autonomous ground vehicle is approaching the restricted access area with the identified autonomous ground vehicle; and
- transmit instructions to the identified autonomous ground vehicle to not enter the restricted access area when the processor determines that the identified ground vehicle is not authorized to enter the restricted access area or that an object other than the identified ground vehicle is attempting to enter the restricted access area with the identified ground vehicle.

18. The non-transitory computer readable medium of claim 17, wherein the instructions cause the processor to identify an autonomous ground vehicle approaching the restricted access area by identifying the autonomous ground vehicle approaching the restricted access area using a first sensor, and to determine if the object other than the identified autonomous ground vehicle is approaching the restricted access area with the identified autonomous ground vehicle using the first sensor.

19. The non-transitory computer readable medium of claim 17, wherein the instructions cause the processor to identify the autonomous ground vehicle approaching the restricted access area by using a first sensor, and to determine if the object other than the identified autonomous ground vehicle is attempting to enter the restricted access area by determining if the object that is not the identified autonomous ground vehicle is located near the identified autonomous ground vehicle using the first sensor.

20. The non-transitory computer readable medium of claim 17, wherein the instructions cause the processor to determine if an object other than the identified autonomous ground vehicle is attempting to enter the restricted access area by capturing at least one image of an area around the identified autonomous ground vehicle using an optical sensor and performing image recognition on the at least one image to identify any object in the image that is not the identified autonomous ground vehicle.

* * * * *

UNITED STATES PATENT AND TRADEMARK OFFICE
CERTIFICATE OF CORRECTION

| | | |
|---|---|---|
| PATENT NO. | : 11,330,395 B2 | Page 1 of 1 |
| APPLICATION NO. | : 16/791340 | |
| DATED | : May 10, 2022 | |
| INVENTOR(S) | : Bosworth et al. | |

It is certified that error appears in the above-identified patent and that said Letters Patent is hereby corrected as shown below:

On the Title Page

Item (72), Line 3, Under "Inventors", delete "Mcdaniel" and insert therefor -- McDaniel --.

Signed and Sealed this
Thirteenth Day of September, 2022

Katherine Kelly Vidal
*Director of the United States Patent and Trademark Office*